United States Patent [19]

Maegawa et al.

[11] Patent Number: 4,954,930
[45] Date of Patent: Sep. 4, 1990

[54] ILLUMINATION LIGHT GUIDE

[75] Inventors: Mamoru Maegawa; Fumio Sakamoto, both of Furukawa, Japan

[73] Assignee: Alps Electric Co., Ltd., Tokyo, Japan

[21] Appl. No.: 412,071

[22] Filed: Sep. 25, 1989

[30] Foreign Application Priority Data

Sep. 27, 1988 [JP] Japan .......................... 63-125146[U]

[51] Int. Cl.$^5$ ................................................ F21V 8/00
[52] U.S. Cl. ........................................ 362/26; 362/31; 362/32; 362/85
[58] Field of Search .................... 362/26, 31, 32, 85

[56] References Cited

U.S. PATENT DOCUMENTS

| | | | |
|---|---|---|---|
| 2,480,178 | 8/1949 | Zinberg | 362/31 |
| 2,498,436 | 2/1950 | Legras | 362/26 |
| 2,671,163 | 3/1954 | Minter | 362/26 |
| 3,043,038 | 7/1962 | Marble | 362/26 |
| 3,223,833 | 12/1965 | Protzmann | 290/6.93 |
| 3,699,915 | 10/1972 | Greene | 362/26 |
| 4,124,879 | 11/1978 | Schoemer | 362/32 |
| 4,389,698 | 6/1983 | Cibie | 362/32 |
| 4,765,701 | 8/1988 | Cheslak | 362/26 |

FOREIGN PATENT DOCUMENTS 2754618 6/1979 Fed. Rep. of Germany ........ 362/26

*Primary Examiner*—Ira S. Lazarus
*Assistant Examiner*—Richard R. Cole
*Attorney, Agent, or Firm*—Guy W. Shoup; Paul J. Winters

[57] ABSTRACT

An illumination light guide includes a plurality of elongated illuminating portions; a light guiding path portion connecting one end of each of the illuminating portions; a light receiving portion formed in the light guiding path portion; a plurality of light distributing/reflecting portions formed in the light guiding path portion so as to correspond to the illuminating portions and having different lengths such that the longer a distance from the light receiving portion to one of the light distributing/reflecting portions, the longer a length of the one of the light distributing/reflecting portions; and a plurality of light reflecting portions formed at the other ends of the illuminating portions, respectively. With this structure, the light emitted from a single light source is received by the light receiving portion, and is uniformly distributed and reflected by the light distributing/reflecting portions and transmitted into the respective illuminating portions. Light transmitted through the illuminating portions is also reflected by the respective light reflecting portions, and is returned into the adjacent illuminating portions to ensure uniform illumination.

3 Claims, 3 Drawing Sheets

ILLUMINATION LIGHT GUIDE

BACKGROUND OF THE INVENTION

The present invention relates to an illumination light guide, and more particularly to an illumination light guide for lighting a character plate as an indicator for use with a remote control device or the like.

Conventionally, such an illumination light guide includes a plurality of illuminating portions so arranged as to correspond to rows of characters arranged on the character plate. The illuminating postions are adapted to be illuminated by corresponding light sources such as LEDs provided in opposition to one end of each illuminating portion.

However, due to the design of this prior art illumination light guide having plural illuminating portions with corresponding plural LEDs assembly of the illuminating portions and the LEDs is troublesome. Further, as the plural LEDs are provided, the related cost and power consumption is increased.

SUMMARY OF THE INVENTION

Accordingly, it is an object of the present invention to provide an illumination light guide which may be simply assembled and which has a reduced cost and the power consumption.

It is another object of the present invention to provide an illumination light guide which uniformly illuminates the plural illuminating portions with a single LED.

According to the present invention, there is provided an illumination light guide comprising a plurality of elongated illuminating portions; a light guiding path portion connecting one each of end of said illuminating portions; a light receiving portion formed in said light guiding path portion; a plurality of light distributing/reflecting portions formed in said light guiding path portion so as to correspond to said illuminating portions and having different lengths such that the longer a distance from said light receiving portion to one of said light distirbuting/reflecting portions, the longer a length of the one of said light distributing/reflecting portions; and a plurality of light reflecting portions formed at the other ends of said illuminating portions, respectively.

With this arrangement, the light received by the light receiving portion can be uniformly distributed by the light distributing/reflecting portions to the plural illuminating portions. Furthermore, the light transmitted through the illuminating portions can be reflected by the reflecting portions and be returned to the illuminating portions. Accordingly, the illuminating portions can be uniformly illuminated with the single LED.

Other objects and features of the invention will be more fully understood from the following detailed description and appended claims when taken with the accompanying drawings.

DETAILED DESCRIPTION OF THE PREFERRED EMBODIMENTS

There will now be described some preferred embodiments of the present invention with reference to the drawings.

Figure 1:
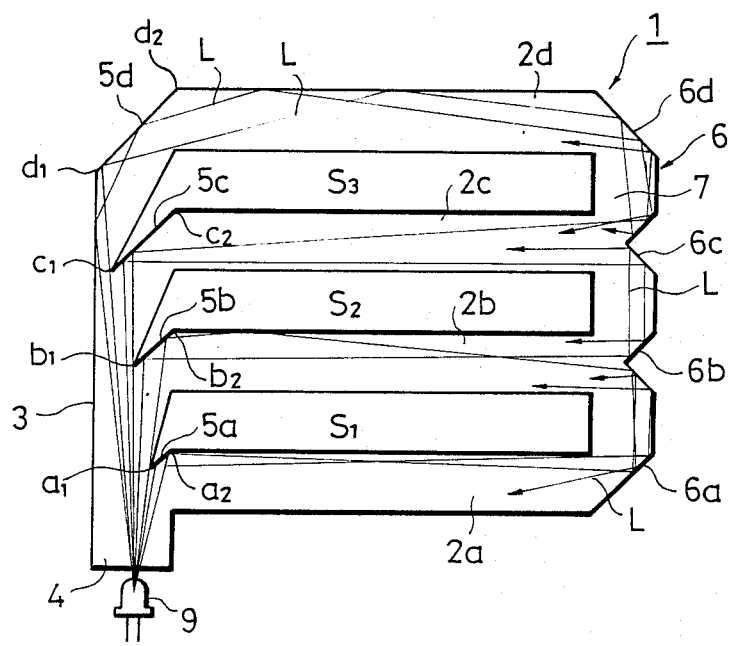
FIG. 1 is a planar view of a first preferred embodiment of the illumination light guide according to the present invention.
Figure 2:
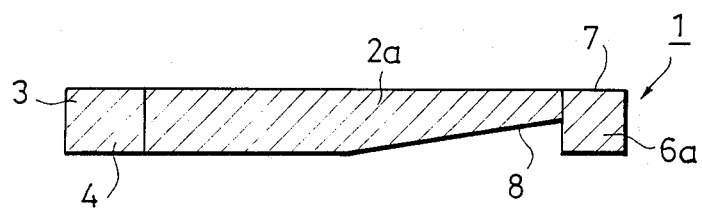
FIG. 2 is a side view of FIG. 1.

Referring first to FIGS. 1 and 2 which show a first preferred embodiment of the present invention, reference numeral 1 generally designates an illumination light guide formed of acrylic resin, for example. The illumination light guide 1 is formed with a plurality of elongated illuminating portions 2a, 2b, 2c and 2d arranged at equal intervals.

A light guiding path portion 3 is formed to connect one end of each (each left end as viewed in FIG. 1) of the illuminating portions 2a -2d and extends in a direction substantially perpendicular to a longitudinal direction of the illuminating portions 2a -2d. The light guiding path portion 3 is formed at its lower end as viewed in FIG. 1 with a light receiving portion 4 projecting downwardly from the lowermost illuminating portion 2a.

The light guiding path portion 3 is further formed with a plurality of light distributing/reflecting portions 5a, 5b, 5c and 5d for distributing and reflecting the light received from the light receiving portion 4 to the illuminating portions 2a, 2b, 2c and 2d, respectively. The light distributing/ reflecting portions 5a-5d are so formed as to be inclined at an angle of about 45 degrees with respect to the longitudinal direction of the respective illuminating portions 2a-2d. The light distributing/reflecting portions 5a-5d have different lengths such that the longer a distance from the light receiving portion 4 to one of the light distributing/reflecting portions 5a-5d, the longer the length of the one of the light distributing/reflecting portions 5a-5d. In other words, the distance between a lower end $a_1$ and an upper end $a_2$ of the light distributing/reflecting portion 5a is shorter than the distance between a lower end $b_1$ and an upper end $b_2$ of the light distributing/reflecting portion 5b, which in turn has a distance which is shorter than the distance between a lower end $c_1$ and an upper end $c_2$ of the light distributing/reflecting portion 5c, which in turn has a distance is shorter than the distance which between a lower end $d_1$ and an upper end $d_2$ of the light distributing/reflecting portion 5d. With this construction, the light received from the light receiving portion 4 into the light guiding path portion 3 can be uniformly distributed to each of the illuminating portions 2a-2d.

There is defined an elongated space $S_1$ between the illuminating portions 2a and 2b, an elongated space $S_2$ between the illuminating portions 2b and 2c, and an elongated space $S_3$ between the illuminating portions 2c and 2d. The spaces $S_1$, $S_2$ and $S_3$ have respective triangular end portions one surface of each of the triangular end portions forms the light distributing/reflecting portions 5a-5c. The remaining light distributing/reflecting portion 5d is formed by chamfering an upper corner of the light guiding path portion 3 as viewed in FIG. 1.

The illumination light guide 1 is formed at the other end (the right end as viewed in FIG. 1) with a light reflecting portion 6 composed of a plurality of light reflecting portions 6a, 6b, 6c and 6d corresponding to the illuminating portions 2a, 2b, 2c and 2d, respectively. The right ends of the illumninating portions 2a-2d are integrally connected with each other by connecting portions 7, and the reflecting portion 6 is formed outside the connecting portions 7. The reflecting portions 6a and 6d are formed by chamfering upper and lower right corners of the illumination light guide 1 at an angle of 45 degrees such that the right ends of the illuminating portions 2a and 2d are formed across a width thereof into the reflecting portions 6a and 6d. On the other hand, the reflecting portions 6b and 6c are formed from cutouts at the right ends of the illuminating portions 2b and 2c, each cutout forming an isosceles triangle having an apex angle of 90 degrees.

As shown in FIG. 2, each of the illuminating portions 2a-2d is formed at its bottom with an upward slant surface 8. Each slant surface 8 extends from a substantially central position of each bottom of the illuminating portions 2a-2d to the reflecting portion 6. The bottoms of the illuminating portions 2a-2d are machined and may be stain-finished or knurled, or painted or printed in white, so as to upwardly reflect and diffuse the light distributed into the illuminating portions 2a-2d.

Figure 3:
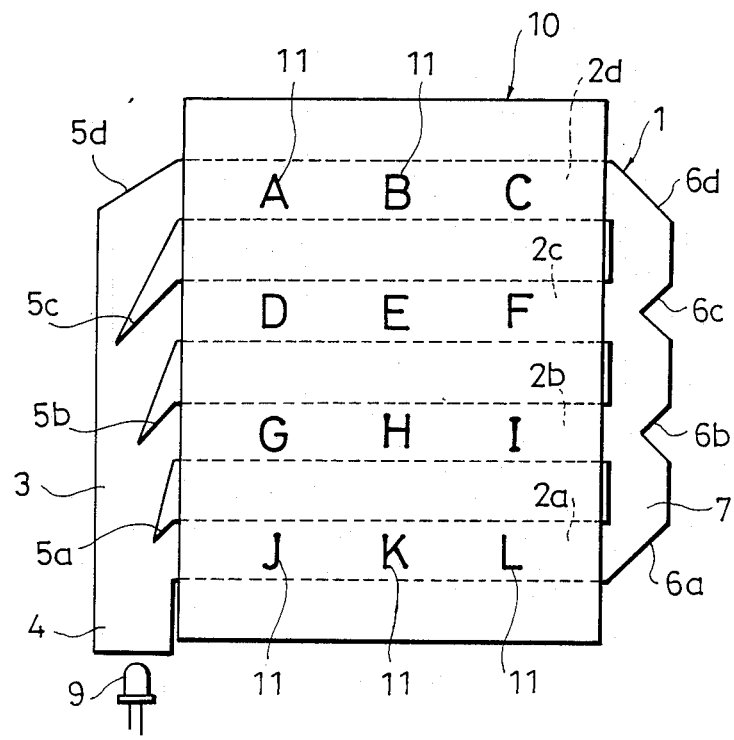
FIG. 3 is a planar view of an indicating device employing the illumination light guide shown in FIG. 1.
Figure 4:
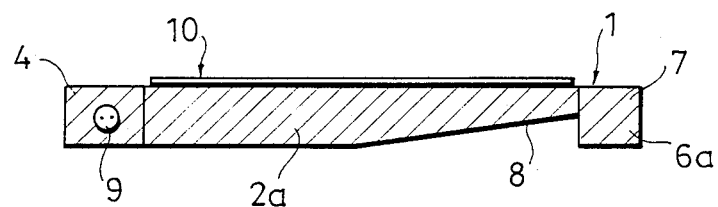
FIG. 4 is a side view of FIG. 3.

The illumination light guide 1 as constructed above is applied to an indicating device as shown in FIGS. 3 and 4. The indicating device includes a single LED 9 located in an opposed relationship to the light receiving portion 4 of the illumination light guide 1, and also includes a character plate 10 disposed on the upper surface of the illumination light guide 1. The character plate 10 is formed with a plurality of character portions 11 consisting of characters A to L, for example, in such a manner that the characters A to C, D to F, G to I, and J to L correspond to the illuminating portions 2a, 2b, 2c and 2d, respectively.

In operation, when the LED 9 is turned on to emit light therefrom, the light is received from the light receiving portion 4 of the illumination light guide 1 into the light guiding path portion 3. Then, the light is distributed by the light distributing/reflecting portions 5a-5d, and the distributed light is simultaneously reflected thereby at an angle of about 45 degrees. The reflected light is transmitted into each of the illuminating portions 2a-2d, thereby illuminating the character portions 11 of the character plate 10. Some of the light transmitted into the illuminating portions 2a-2d is reflected upwardly (as viewed in FIG. 4) by the slant surfaces 8 formed at the bottoms of the illuminating portions 2a-2d, thereby compensating attenuation of the light transmitted to the character portions 11 located at relatively farther positions from the LED 9, and ensuring uniform lighting to all the character portions 11. Further, some of the light transmitted into the illuminating portions 2a-2d is also reflected by the reflecting portions 6a-6d, and the reflected light from the reflecting portions 6a-6d is transmitted again into adjacent illuminating portions 2a-2d, thereby compensating attenuation of the light transmitted to the character portions 11 located at the relatively farther positions from the LED 9. For example, light transmitted through the illuminating portion 2d is first reflected by the reflecting portion 5d, and is next reflected by the reflecting portion 6d. Then, the reflected light is transmitted into the illuminating portion 2c adjacent to the illuminating portion 2d as shown by light paths L in FIG. 1. Similarly, the light reflected by the light distributing/reflecting portion 5c and transmitted into the illuminating portion 2c is reflected by the reflecting portion 6c. Then, the reflected light is transmitted into the illuminating portions 2d and 2b adjacent to the illuminating portion 2c.

As mentioned above, the illumination light guide 1 of the preferred embodiment is constructed of the plural elongated illuminating portions 2a-2d spaced from each other; the light guiding path portion 3 connecting one end of each the illuminating portions 2a-2d; the light receiving portion 4 formed at a longitudinal end of the light guiding path portion 3; the plural light distributing/reflecting portions 5a-5d formed in the light guiding path portion 3 so as to correspond to the illuminating portions 2a-2d and having different lengths such that the longer the distance from the light receiving portion 4 to one of the light distributing/reflecting portions 5a-5d, the longer the length of the one of the light distributing/reflecting portions 5a-5d; and the light reflecting portions 6a-6d formed at the other ends of the illuminating portions 2a-2d, respectively.

With this construction, the light received by the light receiving portion 4 can be uniformly distributed by the light distributing/reflecting portions 5a-5d into the illuminating portions 2a-2d. Furthermore, the light transmitted through the illuminating portions 2a-2d is reflected by the reflecting portions 6a-6d, and is transmitted again into the adjacent illuminating portions 2a-2d. Accordingly, the character portions 11 can be uniformly lighted by the single LED 9 through the illuminating portions 2a-2d irrespective of the different distances from the LED 9 to the character portions 11. Additionally, assembly of the indicating device may be simplified to thereby reduce cost.

Figure 5:
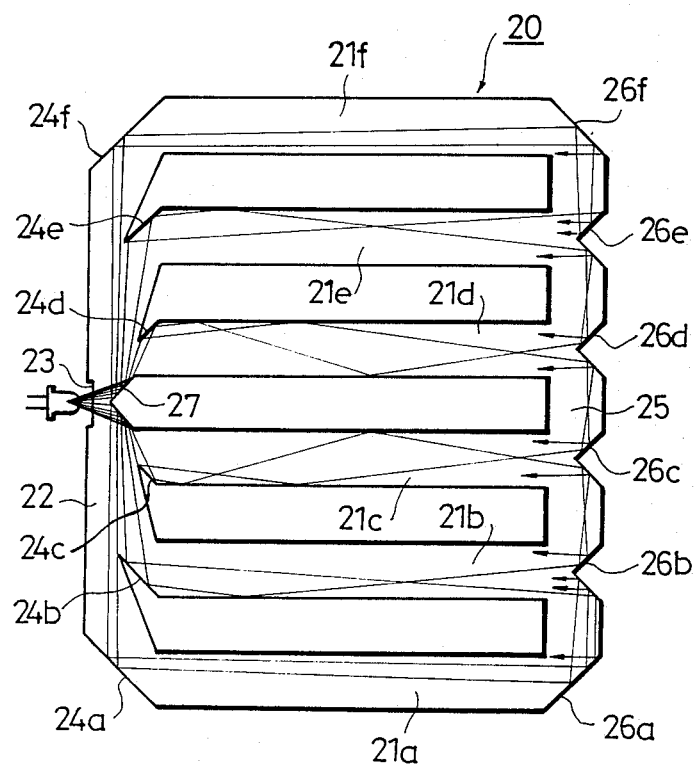
FIG. 5 is a planar view of a second preferred embodiment of the illumination light guide according to the present invention.

Referring next to FIG. 5 which shows another preferred embodiment of the present invention, reference numeral 20 designates an illumination light guide having six illuminating portions 21a-21f. The left ends of the illuminating portions 21a-21f as viewed in FIG. 5 are integrally connected by a light guiding path portion 22. The light guiding path portion 22 is formed at its longitudinally central position with a recess 23 as a light receiving portion, and is also formed with a reflecting portion 27 on the opposite side of the recess 23 for reflecting the light received by the light receiving portion 23. The reflecting portion 27 is formed by opposite sides of a triangular cutout defined between the left edges of the adjacent illuminating portions 21c and 21d. The light reflected by the reflecting portion 27 is transmitted through the light guiding path portion 22 in a substantially longitudinal direction thereof.

The light guiding path portion 22 is further formed with six light distributing/reflecting portions 24a-24f corresponding to the illuminating portions 21a-21f. In the same manner as the first preferred embodiment, the lengths of the light distributing/reflecting portions 24c and 24d arranged near the light receiving portion 23 are shorter than the lengths of the light distributing/reflecting portions 24b and 24e arranged just outside of the light distributing/reflecting portions 24c and 24d, respectively, which in turn have lengths which are shorter than the lengths of the outermost light distributing/reflecting portions 24a and 24f.

The right ends of the illuminating portions 21a-21f are integrally connected by connecting portions 25, and light reflecting portions 26a-26f are formed outside the connecting portions 25 so as to correspond to the illuminating portions 21a-21f, respectively, so that the light reflected by the reflecting portions 26a-26f is transmitted again into adjacent illuminating portions 21a-21f in the same manner as the first preferred embodiment. The construction is the same as the first preferred embodiment, and the effect to be exhibited by the second preferred embodiment is similar to the first preferred embodiment.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An illumination light guide comprising:
   a plurality of elongated illuminating portions;
   a light guiding path portion connecting one end of each of said illuminating portions;
   a light receiving portion formed in said light guiding path portion;
   a plurality of light distirbuting/reflecting portions formed in said light guiding path portion so as to correspond to said illuminating portions and having different lengths such that the longer a distance from said light receiving portion to one of said light distributing/ reflecting portions, the longer a length of the one of said light distributing/reflecting portions;
   a plurality of light reflecting portions formed at the other ends of said illuminating portions, respectively ; and
   a plurality of slant surfaces for reflecting light upwardly, a single one of said slant surfaces formed at the bottom of each of said illuminating portions.

2. The illumination light guide of claim 1 wherein said plurality of light reflecting portions are formed to reflect light from a corresponding illuminating portion to adjacent illuminating portions.

3. The illumination light guide of claim 2 wherein each of said light distributing/reflecting portions are formed at an angle between 90 and 180 degrees with respect to the elongated direction of said illuminating portions.

* * * * *